US012235629B2

(12) United States Patent
Pohle et al.

(10) Patent No.: US 12,235,629 B2
(45) Date of Patent: Feb. 25, 2025

(54) ENGINEERING SYSTEM AND METHOD FOR CONFIGURING AND PARAMETERIZING FIELD BUS SUBSCRIBERS

(71) Applicant: Siemens Aktiengesellschaft, Munich (DE)

(72) Inventors: Michael Pohle, Chemnitz (DE); Sebastian Kemptner, Fensterbach-Dürnsricht (DE); Dirk Schneider, Lichtentanne (DE)

(73) Assignee: Siemens Aktiengesellschaft, Munich (DE)

( * ) Notice: Subject to any disclaimer, the term of this patent is extended or adjusted under 35 U.S.C. 154(b) by 329 days.

(21) Appl. No.: 17/793,973

(22) PCT Filed: Dec. 8, 2020

(86) PCT No.: PCT/EP2020/085062
§ 371 (c)(1),
(2) Date: Jul. 20, 2022

(87) PCT Pub. No.: WO2021/148187
PCT Pub. Date: Jul. 29, 2021

(65) Prior Publication Data
US 2023/0103137 A1  Mar. 30, 2023

(30) Foreign Application Priority Data

Jan. 22, 2020 (EP) .................................... 20153152

(51) Int. Cl.
*G05B 19/41* (2006.01)
*G05B 19/418* (2006.01)
*G06F 9/445* (2018.01)

(52) U.S. Cl.
CPC ............... *G05B 19/41865* (2013.01); *G05B 19/4183* (2013.01); *G05B 19/4185* (2013.01); *G06F 9/44505* (2013.01)

(58) Field of Classification Search
None
See application file for complete search history.

(56) References Cited

U.S. PATENT DOCUMENTS

| 6,449,715 | B1 | 9/2002 | Krivoshein |
| 6,473,824 | B1 | 10/2002 | Kreissig et al. |
| 6,947,389 | B1 | 9/2005 | Chen et al. |
| 7,167,762 | B2 * | 1/2007 | Glanzer .................. G05B 9/02 702/182 |

(Continued)

FOREIGN PATENT DOCUMENTS

| CN | 101208674 | 6/2008 |
| CN | 101784965 | 7/2010 |

(Continued)

OTHER PUBLICATIONS

PCT International Search Report dated Mar. 1, 2021 based on PCT/EP2020/085062 filed Dec. 8, 2020.

(Continued)

*Primary Examiner* — Craig C Dorais
(74) *Attorney, Agent, or Firm* — Cozen O'Connor

(57) ABSTRACT

A method for configuring and parameterizing field bus subscribers interconnected via a field bus, wherein a first field bus subscriber provides and/or receives process data and a second field bus subscriber allows a user program to run, where a topology is determined by a configuration tool with configuration parameters of the field bus subscribers in a configuration file, the first field bus subscriber is parameterized for subsequent communication via the field bus with a configuration data set including a first part of the configuration file, from the configuration file and further code portions from a program library, an object-orientated class is generated with elements and functions for communication (Continued)

between the first and second field bus subscribers, and the class is instanced in the user program of the second field bus subscriber, the functions being used for communication during execution of the user program to permit access to the process data.

15 Claims, 6 Drawing Sheets

(56) References Cited

U.S. PATENT DOCUMENTS

| | | | |
|---|---|---|---|
| 2004/0098139 A1* | 5/2004 | Fehrer | H04L 9/40 700/83 |
| 2007/0067053 A1 | 3/2007 | Menzl et al. | |
| 2009/0119437 A1 | 5/2009 | Hilscher | |
| 2010/0293539 A1 | 11/2010 | Lefebvre | |
| 2010/0305720 A1 | 12/2010 | Doll et al. | |
| 2012/0041571 A1 | 2/2012 | Biehler | |
| 2013/0042019 A1 | 2/2013 | Galles et al. | |
| 2018/0013582 A1 | 1/2018 | Sotriffer et al. | |
| 2018/0139102 A1 | 5/2018 | Luber et al. | |
| 2018/0276153 A1 | 9/2018 | Hansing et al. | |
| 2019/0101910 A1* | 4/2019 | Schleiss | G05B 23/0272 |

FOREIGN PATENT DOCUMENTS

| | | |
|---|---|---|
| CN | 101866326 | 10/2010 |
| DE | 102011005062 | 9/2012 |
| DE | 102015101057 | 7/2016 |
| DE | 102015108053 | 11/2016 |
| EP | 1752896 | 2/2007 |
| EP | 2482148 | 8/2012 |

OTHER PUBLICATIONS

EP Search Report dated Jun. 23, 2020 based on EP20153152 filed Jan. 22, 2020.

Zhao Hua Rui "Design and implementation of real-time middleware on multi-fieldbus amalgamation"; School of Information Engineering, Zhengzhou University, Zhengzhou 450001, China; 2. Henan Provincial Key Lab on Information Network, Zhengzhou 450052, China; 3. School of Computer Science and Engineering, Beijing University of Aeronautics and Astronautics, Beijing 100083, China; 2010-01-28.

Wang Ting et al. "Fieldbus Device Description of EPA Based on XML"; AutomationCollege , Chongqing Univ . of Postsand Telecommunications, China, Huangshi Institute of Technology , Huangshi 435003 , China; 2009-02-10.

* cited by examiner

ENGINEERING SYSTEM AND METHOD FOR CONFIGURING AND PARAMETERIZING FIELD BUS SUBSCRIBERS

CROSS-REFERENCE TO RELATED APPLICATIONS

This is a U.S. national stage of application No. PCT/EP2020/085062 filed 8 Dec. 2020. Priority is claimed on European Application No. 20153152.2 filed 22 Jan. 2020, the content of which is incorporated herein by reference in its entirety.

BACKGROUND OF THE INVENTION

Field of the Invention

The invention relates to a method for the configuring and parameterizing fieldbus subscribers interconnected via a fieldbus, where at least one first fieldbus subscriber is configured to provide and/or receive process data and a second fieldbus subscriber is configured to allow a user program to run, and where in a first step, utilizing a configuration tool, a topology having configuration parameters of the fieldbus subscriber is determined in a configuration file and, in a second step, the first fieldbus subscriber is parameterized for subsequent communication via the fieldbus utilizing at least one configuration data set comprising at least one first part of the configuration file.

The invention also relates to an engineering station for the configuration and parameterization of fieldbus subscribers interconnected via a fieldbus, where at least one first fieldbus subscriber is configured to provide and/or receive process data and a second fieldbus subscriber is configured to allow a user program to run. The engineering tool comprises a configuration tool that is configured so as, in an editor, to determine a topology utilizing configuration parameters of the fieldbus subscribers in a configuration file, and a parameterization tool that is configured so as to parameterize and load the first fieldbus subscriber for subsequent communication via the fieldbus using at least one configuration data set comprising at least a first part of the configuration file.

EP 1 752 896 B1 discloses an engineering system for the parameterization of automating assemblies.

EP 2 482 148 B1 also describes a method for project development and/or programming of a multifunctional component of an industrial automating arrangement.

U.S. Pat. No. 6,473,824 B1 discloses a method for configuring and parameterizing fieldbus subscribers, where an object-oriented method is used.

DE 10 2015 108 053 A1 discloses a method for automatic detection of a topology of a fieldbus network.

U.S. Pat. No. 6,449,715 B1 discloses a method and system for configuring Profibus devices.

For example, the TIA portal of the company Siemens AG is known as an engineering station. The TIA portal is an automation framework for the CPU families of the Simatic SPS, where "TIA" stands for totally integrated automation. In the TIA portal, all necessary software tools are unified under one user interface. The TIA portal renders possible the complete access to the entire digitized automation of digital planning via integrated engineering up to the transparent operation. Both system integrators and mechanical engineers as well as installation operators benefit from the demonstrated possibilities. A TIA portal is therefore the perfect gateway to automation in the digital automation world.

A project development of an installation comprising the configuration and the parameterization and also a programming and control, for example, of decentralized peripheral systems is possible using the TIA portal. It is, however, a disadvantage that, if only a small installation configuration or parameterization is desired, for example, then the TIA portal represents an overly powerful software component for the "small" solution and is even too challenging for an inexperienced commissioning technician.

SUMMARY OF THE INVENTION

It is therefore an object of the invention to provide a solution, in particular for the parameterization of decentralized peripheral devices that simplifies the parameterization, configuration and subsequent commissioning.

This and other objects and advantages are achieved in accordance with the invention by a method in which, after the above-described first and second steps, a third step is performed in which an object-oriented class having elements and functions for communication between a second fieldbus subscriber and a first fieldbus subscriber is generated from a configuration file and further code parts from a program library, where in a subsequent fourth step the class is instantiated in the user program of the second fieldbus subscriber and when the user program is being executed the functions are used for the communication whereby the access to the process data is rendered possible. A class thereupon represents a small "code snippet" that is possible to easily insert into a user program and can be instantiated with corresponding O++ commands.

In particular, with respect to parameterizing Profinet fieldbus subscribers, the fieldbus subscribers are divided into at least two of the following types: an IO controller type and an IO device type, where the IO controller type is a type of device that assumes control tasks and in which the user program is executed, and the IO device type is a type of device that receives data as a field device from an industrial process or outputs data to an industrial process, where the device is controlled by the devices of the IO controller type, where in order to construct a mesh network architecture having a plurality of such devices, the fieldbus that is already provided is used and using the configuration tool a mesh network topology with the configuration parameters of the fieldbus subscribers is determined in a mesh configuration file, and where the generation of the class is divided into a generation of a server class and into a generation of a client class and in fieldbus subscribers of the type IO controller the two classes are instantiated in the user program and in the fieldbus subscribers of the type IO device at least the server class is instantiated, where bidirectional communication is also implemented between the fieldbus subscribers of the IO controller type by the additional server class and the additional client class when the respective user program is being executed in the respective fieldbus subscribers, a "cross traffic" between the controllers being accordingly possible. A total networking, i.e., all devices speaking with all devices, is consequently easily parameterized on an existing ethernet network. A new type of network architecture is therefore obtained with respect to the previous possibilities of the communication and parameterization of in particular decentralized peripheral subscribers. In principle, a smart grid for the communicative connection of all actors in a fieldbus system is now possible.

It has proven advantageous for the generation of the object-oriented class having elements and functions if a first source code part comprises code and compile options for handling different second fieldbus subscribers, where the second fieldbus subscribers are formed as a target platform of a different hardware specification, a second source code part that comprises code from interface descriptions of the first fieldbus subscriber, a third source code part that comprises code from interface descriptions regarding IO mapping classes of the first fieldbus subscriber, a fourth source code part that comprises code of descriptions of the relationships between the above mentioned code parts and the configurations or parameterizations of all the fieldbus subscribers with respect to device types, IO module types or IO submodule types, a fifth source code part that comprises code from descriptions of different protocol tags for different types of fieldbus communications.

The above-described code parts have preferably been obtained with their configuration parameters from a device master data file for the individual fieldbus subscribers. A "GSD" or "GSD file" likewise also means an XML-based form. Building on a GSD file, with the introduction of the general station description markup language (GSDML), the characteristic of an XML-based document being able to form arbitrary hierarchy levels was used for the purpose of mapping a hierarchical device model. GSD files or GSDML schema files are created, maintained and provided for download via a PNO webserver by the profile user organization (PNO) work group. An existing GSDML file can preferably be supplemented with the aid of the invention with information for the code generation, and a GSDSMLe, in other words an extended file that has been broadened with C classes for the communication, results from the information.

Preferably, the embedding of a generated program code and an instantiation is performed via a software development environment. A software development environment is also referred to as an integrated development environment (IDE). For example, Eclipse could be used as a possible software development environment. Eclipse is an open-source programming tool for the development of software of different types. Originally, Eclipse was used as an integrated development environment (IDE) for the programming language Java, however, since then Eclipse is also used for many other development tasks owing to its ability to be expanded, such as in this case for the embedding and instantiation of the generated program code into the corresponding fieldbus subscriber using an executable user program.

In accordance with the method, it is furthermore advantageous if during the determination of the topology, on the one hand, a parallel and independent access of at least two different fieldbus subscribers of the type IO controller to the process data of the same fieldbus subscriber of the type IO device is taken into consideration and, on the other hand, a free allocation of process data of arbitrary fieldbus subscribers of the type IO device to fieldbus subscribers of the type IO controller is taken into consideration and the mesh configuration file is provided from this determination (configuration), and the server classes and the client classes having corresponding access rights and access paths are generated with the aid of the mesh configuration file.

With respect to the technical aspects of programming, it has proven advantageous to generate the generated class or, in the case of generating subclasses, to generate the following construction and following performance features for the classes, where the classes are preferably illustrated in a C++ notation:

Class: user interface
Which is available at least once per fieldbus subscriber, user interface includes all access possibilities to the IO modules/submodules of the fieldbus subscriber comprising functions that allow an access via symbols that are clear station wide or an access via module slots as a whole or also in a bit granular manner, where links to operators can also be implemented.

Class: user interface to IO mapping
Which is available at least once per fieldbus subscriber and includes address data of the fieldbus subscriber and which controls the exchange of data between a user interface class and a communication stack class.

Class: communication stack
Which performs calls of communication methods or functions of a protocol stack and therefore assumes the communication setup to the fieldbus subscriber.

Class: network stack
Which is generated once per fieldbus and can be used equally by all the above-mentioned classes, where other communication stack classes can be preferably embedded here.

A further feasible class would be the simulation class.

This class is available once per fieldbus device type/IO module type/submodule type. The simulation class includes the behavior of each fieldbus device type/IO module type/submodule type, such as within the fieldbus network/string, for example, for a PWM or cam function of a DQ assembly or a simple on/off operation at a terminal of an IO module. The simulation class is used as an alternative to using the class user interface for IO mapping and communication stack to simulate user data and terminal values. The simulation class is attached upwards to the class user interface. The simulation class is attached downwards to a process simulation environment that is to be provided by the user.

It is also an object of the invention to provide an engineering station configuring and parameterizing fieldbus subscribers interconnected via a fieldbus. The engineering station, in addition to the already known configuration tool and the known parameterization tool, in accordance with the invention, includes a program code generator that is configured to generate, from the configuration file and further code parts from a program library, an object-oriented class having elements and functions for the communication between the second fieldbus subscriber and the first fieldbus subscriber, where an installation tool is additionally provided that is configured to instantiate the class in the user program of the second fieldbus subscriber, whereby when the user program is being executed the function for the communication is used and the access to the process data is consequently rendered possible.

In the engineering station, the program library has at least one of the following source code parts: a first source code part that comprises code and compile options for handling different second fieldbus subscribers, where the second fieldbus subscribers are formed as a target platform of a different hardware specification, a second source code part that comprises code from interface descriptions of the first fieldbus subscriber, a third source code part that comprises code from interface descriptions regarding IO mapping classes of the first fieldbus subscriber, a fourth source code part that comprises code of description of the relationships between the above mentioned code parts and the configurations or parameterizations of all the fieldbus subscribers with regard to device types, IO module types or IO submodule types, and a fifth source code part that comprises code from descriptions of different protocol stacks for different types of fieldbus communications.

It is also regarded as a particular advantage that there are now source code parts that describe the fieldbus subscribers if they are formed as target platforms of a different hardware specification, for example, a fieldbus subscriber of the brand Siemens can therefore be trained as IoT 2040, a conventional PC, a single-board computer, an Arduino or an arbitrary piece of hardware for communication in a fieldbus owing to the generated program parts or the generated C++ classes for communication at the fieldbus.

It is advantageous for the engineering station if the program library comprises device master data files for the individual fieldbus subscriber and the device master data files describe characteristic communication features of the fieldbus subscribers.

The engineering station is configured to parameterize and configure the fieldbus subscribers of the type IO controller or IO device type.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method in accordance with the invention and the engineering station in accordance with the invention is further explained below with reference to the drawings, in which.

DETAILED DESCRIPTION OF THE EXEMPLARY EMBODIMENTS

Figure 1:
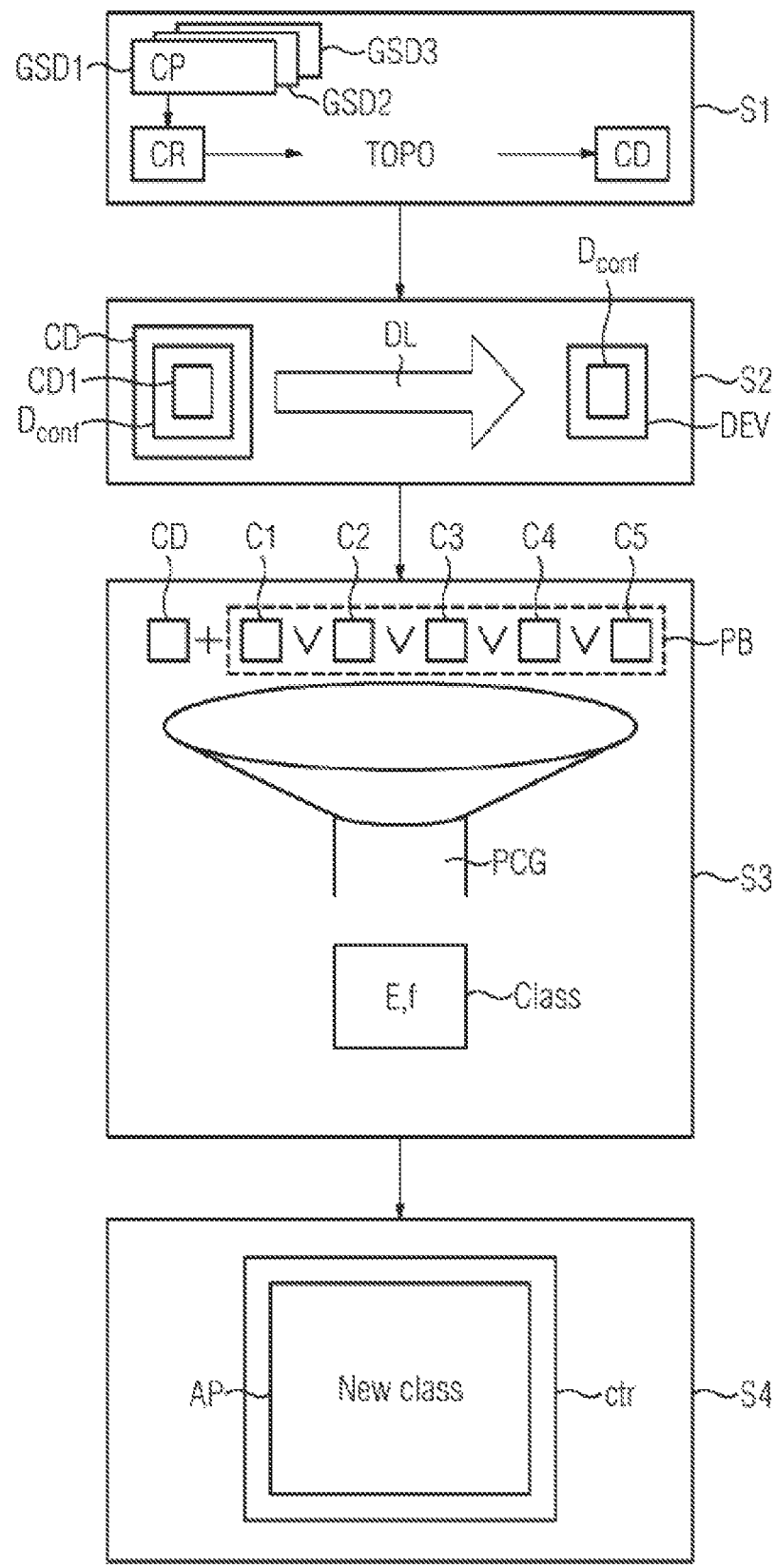
FIG. 1 shows a schematic flow chart of the method in accordance with the invention.
Figure 2:
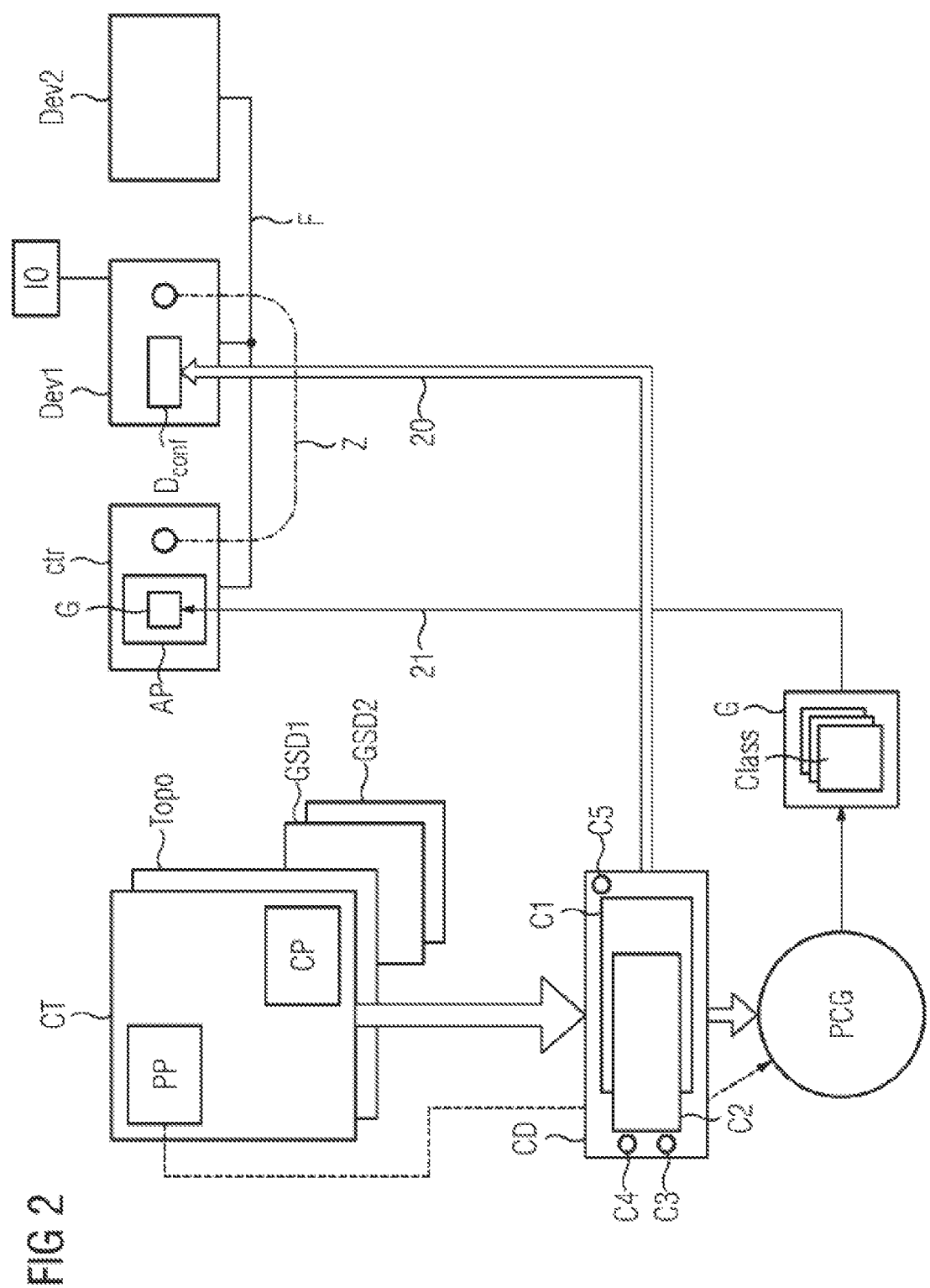
FIG. 2 shows a block diagram illustration for the sequence of the method and the parameterization of fieldbus subscribers in accordance with the invention.

In accordance with FIG. 1, the method sequence configuring and parameterizing fieldbus subscribers Ctr,Dev is illustrated (cf. FIG. 2). With a configuration tool CT (cf. FIG. 2), in a first step S1, a topology Topo having configuration parameters CP of the fieldbus subscriber Ctr,Dev is determined using the configuration tool CT in a configuration file CT. The configuration tool CT, via a first device master data file GSD1, a second device master data file GSD2 and a third device master data file GSD3, has knowledge of the setup of the fieldbus subscribers Ctr,Dev.

In a second step S2, the first fieldbus subscriber Dev is parameterized for later communication via the fieldbus F using at least one configuration data set $D_{conf}$ comprising at least one first part CD1 of the configuration file CD. The particular configuration data set $D_{conf}$ for the first fieldbus subscriber is loaded via a download DL into the first fieldbus subscriber Dev.

In a third step S3, an object-oriented class Class having elements E and functions F for the communication between the second fieldbus subscriber Ctr and the first fieldbus subscriber Dev is generated from the configuration file CD and further code parts C1, C2, C3, C4, C5 from a program library PB. In the third step S3, a program code generator PCG is used so as to generate a "generate" G and the program code generator is configured so as to generate, from the configuration file CD and the further code parts C1, ..., C5 from the program library PB, the object-oriented class Class having elements E and functions F for the communication between the fieldbus subscribers.

In a fourth step S4, the class Class is instantiated in the user program AP of the second fieldbus subscriber Ctr and, when the user program AP is being executed, the functions F for the communication is used whereby the access Z to the process data IO is rendered possible. For example, a C++ command "newclass" is called up in the user program so as to instantiate the class.

FIG. 2 illustrates in a block diagram the generation of object-oriented classes Class via the program code generator PCG, where the program code generator PCG is then active if, via the configuration tool CT, a topology Topo having configuration parameters CP of the fieldbus subscriber Ctr, Dev has been determined in a configuration file CD. The future topology Topo and configuration of the fieldbus subscriber Ctr,Dev1,Dev2 is determined with the aid of the program library PB and the different device master data files GSD1, GSD2. The configuration file CD comprises a first source code part C1, a second source code part C2, a third source code part C3, a fourth source code part C4 and a fifth source code part C5. The program code generator PCG generates the generate G, which includes the classes Class, from the source code parts C1, ..., C5 and the configuration file CD.

The first source code part C1 comprises code and compile options for handling different second fieldbus subscribers Ctr, where as a target platform the second fieldbus subscribers Ctr can have thoroughly different hardware specifications. The second source code part C2 comprises interface descriptions of the first fieldbus subscriber Dev. The third source code part C3 comprises codes of interface descriptions regarding IO mapping classes of the first fieldbus subscriber Dev. The fourth source code part C4 comprises descriptions of the relationships between the above-mentioned code parts and the configurations or parameterizations of all the fieldbus subscribers Ctr, Dev with regard to device types, IO module types or IO submodule types. The fifth source code part C5 comprises descriptions of different protocol stacks for different types of fieldbus communications.

The generate G or the classes Class are embedded via loading 21 the generate G into the user program AP of the fieldbus subscriber Ctr. The configuration data set $D_{conf}$ is loaded via a download 20 into the fieldbus subscriber Dev1.

The classes, in which in particular the communications functions are realized, have now been instantiated and executed in the user program AP. Accordingly, communication between the two fieldbus subscribers Ctr and Dev1 can be rendered possible by the access Z to the process data IO.

Figure 3:
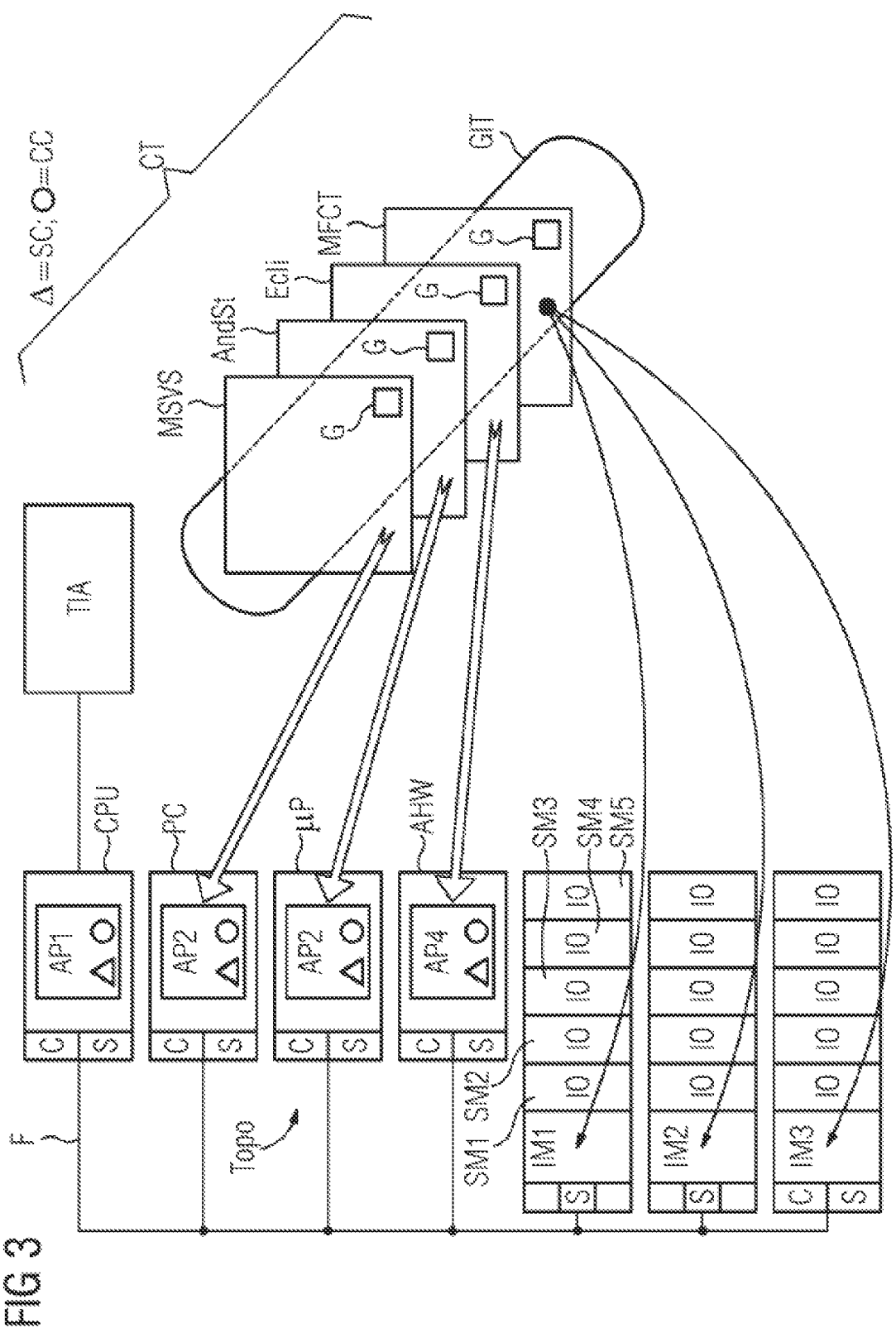
FIG. 3 shows the principle of the parameterization method during use of different target platforms with the addition of a server client functionality in accordance with the invention.

A broadened fieldbus F configuration having different fieldbus subscribers Ctr is illustrated in accordance with FIG. 3. The special feature in the case of this configuration is that there are now fieldbus subscribers Ctr, Dev of two types. A first type is an IO controller type and a second type is an IO device type. The IO controller type is a type of device that assumes control tasks and in which the user program AP is executed. Accordingly, there is a storage programmable controller CPU having a first user program AP1, a personal computer PC having a second user program AP2, a microprocessor µP (single-board computer), for example Arduino, having a third user program AP3 and an arbitrary hardware element AHB (any hardware) having a fourth user program AP4.

The second type of devices, i.e., IO device type, is the type of device that as a field device receives process data IO from an industrial process or outputs data to an industrial process, where the field device is controlled by the devices of the IO controller type. The mentioned field devices are embodied as a first interface module IM1, a second interface module IM2 and a third interface module IM3. The interface modules IM1, IM2, IM3 are formed as decentralized peripheral field devices having submodules and input assemblies and output assemblies for process data IO.

Networked meshed communication to each subscriber is quasi possible owing to the particular type of the class formation, i.e., using the configuration tool CT a mesh network topology Masch-Topo with the configuration parameters CP of the fieldbus subscriber Ctr, Dev can now be determined in a mesh configuration file mCD (cf. FIG. 4), and owing to the broadening the generation of the class Class is now divided into a generation of a server class SC and into a generation of a client class CC and, in particular, the fieldbus subscribers of the type IO controller the two classes SC, CC are instantiated in the user programs AP1, ..., AP4. The fieldbus subscribers of the IO controller type therefore acquire a client functionality C and a server functionality S. Although the fieldbus subscribers IO device type can also each acquire a client functionality C and a server functionality S (see, for example, the third interface module IM3), they are however in general only parameterized with a server functionality S.

A configuration and parameterization of the storage programmable controller CPU passes via a TIA portal TIA, the configuration of the PC is performed via a windows development environment MSVS, the configuration of the microprocessor µP is performed via a cross platform development system ANDST, the configuration of the arbitrary hardware AHW is performed via a C++ development environment Ecli and the configuration of the interface modules IM1, IM2, IM3 is performed via a multifunctional configuration tool MFCT. A file management tool GIT is superimposed on all the mentioned configuration tools or the generate G that is thereby generated.

The interface modules IM1, IM2, IM3 are divided into a first submodule SM1, a second submodule SM2, a third submodule SM3, a fourth submodule SM4 and a fifth submodule SM5. With the configuration tools, a user can now configure a configuration comprising number and type of the IO modules/submodules that are required for the user's installation, such as DI8, DI16, DQ8, DQ32, analogue input AI, analogue output AQ and/or special modules TM, MPU. The class user interface makes it possible, in cooperation with the generated classes for the user, to now implement access to module slots and their data structure such as bits, bytes, words, double words, transmission structures (for example, 5-byte IEEE analogue value) from the user program.

Figure 4:
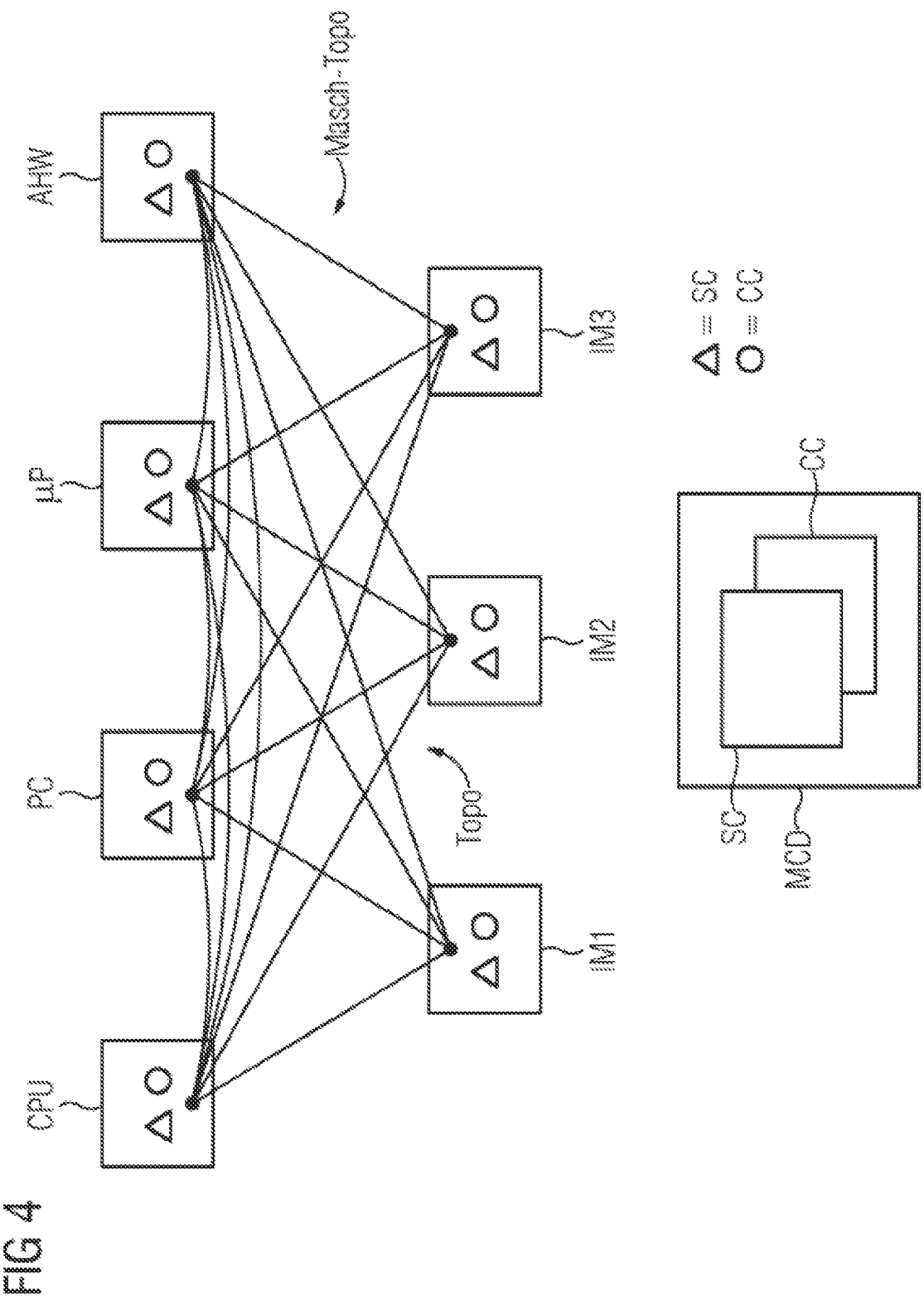
FIG. 4 shows the setup of a mesh network architecture of a plurality of fieldbus subscribers in accordance with the invention, where the network has a mesh network topology.

The versatility of the method is now illustrated with FIG. 4. The reason for this is that it is now possible for each fieldbus subscriber to communicate with each fieldbus subscriber. A mesh network topology MaschTopo is set up using the configuration tool CT. The generation of the mesh configuration file mCD with the server classes SC and the client classes CC included therein renders possible the corresponding access paths. Each fieldbus subscriber now has the server class SC and the client class CC.

Figure 5:
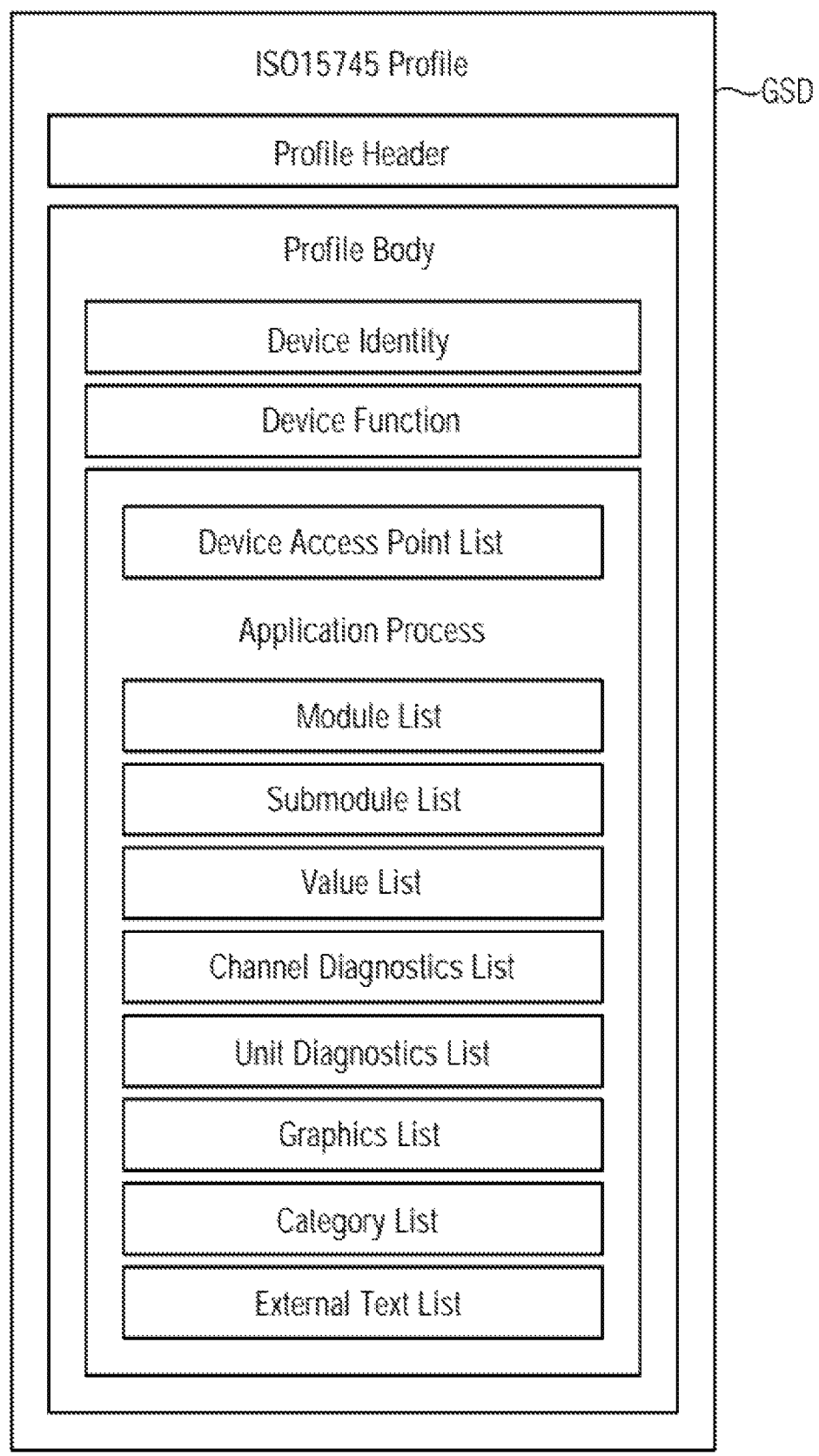
FIG. 5 shows a structure in principle of a GSD file in accordance with the invention.

FIG. 5 illustrates a structure in principle of a GSD file. The profile of a device master data file GSD is determined in the standard ISO 15745. A Profile Header is to be verified using Profinet device profile and specifications. A Profile Body includes the actual data of a field device and is broken down into three parts. A Device Identity includes information with regard to the identification of a field device, and a Device Function includes data that describes the functions. An Application Process is the main part of the description file and "ApplicationProcess". This is the main part of the description file. The most important sections of the application process blocks are listed in the following subsections.

DeviceAccessPointList

This section includes the description of the individual device access points (network access point). As already mentioned, a GSD file can include the description for an arbitrary number of interface modules. The sum of all the device access points (DAP) then forms a device family. The degree of development of a DAP can be configured in the case of modular field devices. Different modules (assemblies) can be allocated to each DAP.

ModuleList

This section includes the description of the individual modules of a field device. These modules can be pluggable (in the case of field devices that are constructed in a modular manner) or can be fixedly integrated into a field device.

SubmoduleList

This section includes the description of the individual submodules of a field device. These submodules can be pluggable (in the case of field devices that are constructed in a modular manner) or can be fixedly integrated into a field device.

ValueList

This section includes the ValueList for individual parameters of a field device, in addition to the parameter name also the allocation between a specific value and an associated text.

ChannelDiagList

This section includes the ChannelDiagList. The ChannelDiagList represents the allocation between a channel error of a field device and the corresponding texts.

UnitDiagTypeList

This section includes the UnitDiagTypeList and describes the structural setup of the generic diagnostics messages of a field device.

LogBookEntryList

The LogBookEntryList describes the meaning of the logbook entries.

GraphicsList

This section includes references to graphical representations of a field device.

CategoryList

This section includes the allocation of a module to a specific category (for example, digital input, and/or analogue output) This is used to break down and improve retrievability within the module catalogue of an engineering tool.

ExternalTextList

This section includes the "ExternalTextList" of the GSDML. All the texts that can be referenced by the other sections are stored here. More in this regard is found in the section "integration of foreign languages".

In general, existing GSD files are assumed and these are adapted to the particular field devices. For example, the example files of the PNO represent an assumption basis. The exemplary files are attached both to the GSDML specifications as well as the Profinet XLM specification.

Figure 6:
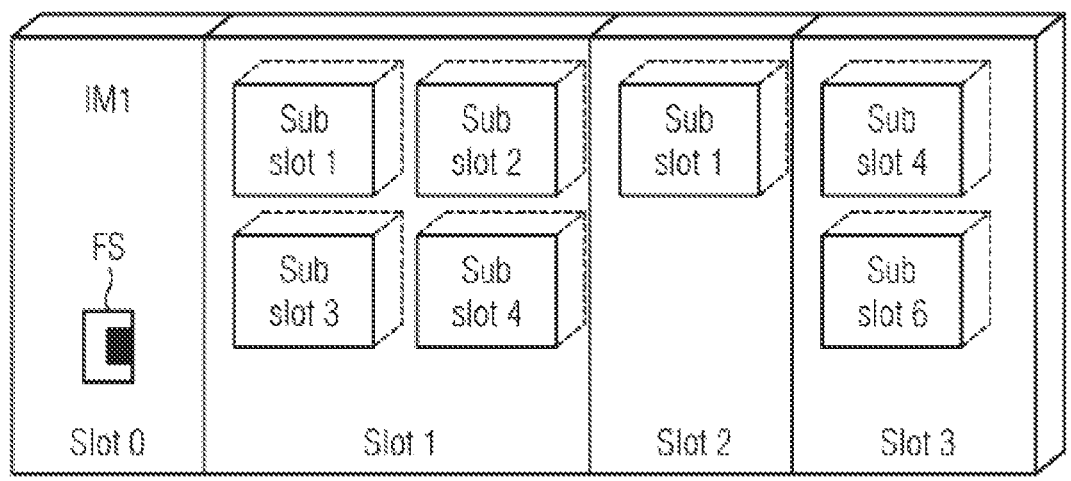
FIG. 6 shows a setup of a modular field device having associated modules in accordance with the invention.

Specifically, a setup type of the interface modules IM1, IM2, IM3 is illustrated with FIG. 6. An interface module as an example of the first interface module IM1 comprises a fieldbus interface FS, where the first section of the interface module can be referred to as a slot 0 and then further slots Slot1, Slot2, Slot3 follow. In one slot, such as in Slot 1, it is in turn possible for subslots SubSlot1, SubSlot2, SubSlot3, SubSlot4 to be parameterized. The slot 2 can however also include only one subslot 1 or the slot 3 can only include one subslot 4 and one subslot 6.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring and parameterizing fieldbus subscribers interconnected via a fieldbus, at least one first fieldbus subscriber being configured to at least one of provide and receive process data and a second fieldbus subscriber being configured to allow execution of a user program, the method comprising:
   utilizing a configuration tool to determine a topology having configuration parameters of the fieldbus subscribers in a configuration file;
   parameterizing the first fieldbus subscriber for subsequent communication via the fieldbus utilizing at least one configuration data set comprising at least one first part of the configuration file;
   generating an object-oriented class having elements and functions for communication between the second fieldbus subscriber and the first fieldbus subscriber from the configuration file and further code parts from a program library; and
   instantiating the class in the user program of the second fieldbus subscriber and utilizing the functions for communication when the user program is being executed such that access to the process data becomes possible.

2. The method as claimed in claim 1, wherein the further code parts comprise at least one of the following source code parts:
   a first source code part which comprises code and compile options for handling different second fieldbus subscribers which are configured as a target platform of a different hardware specification,
   a second source code part which comprises code from interface descriptions of the first fieldbus subscriber,
   a third source code part which comprises code from interface descriptions regarding IO mapping classes of the first fieldbus subscriber,
   a fourth source code part which comprises code descriptions of relationships between the code parts and the configurations or parameterizations of all fieldbus subscribers with respect to device types, IO module types or IO submodule types,
   a fifth source code part which comprises code from descriptions of different protocol stacks for different types of fieldbus communications.

3. The method as claimed in claim 1, wherein the configuration parameters are obtained from a device master data file for individual fieldbus subscribers.

4. The method as claimed in claim 2, wherein the configuration parameters are obtained from a device master data file for individual fieldbus subscribers.

5. The method as claimed in claim 1, wherein embedding of a generated program code and an instantiation is performed via a software development environment.

6. The method as claimed in claim 2, wherein embedding of a generated program code and an instantiation is performed via a software development environment.

7. The method as claimed in claim 3, wherein embedding of a generated program code and an instantiation is performed via a software development environment.

8. The method as claimed in claim 1, wherein the fieldbus subscribers are divided into at least two of following types comprising an IO controller type and an IO device type;
   wherein the IO controller type is a device which assumes control tasks and a device in which the user program is executed, and the IO device type is a device which receives data as a field device from an industrial process or outputs data to an industrial process;
   wherein the device is controlled by the devices of the IO controller type;
   wherein the fieldbus which is already provided is utilized to construct a mesh network architecture having a plurality of said devices, and the configuration tool is utilized to determine a mesh network topology with the configuration parameters of the fieldbus subscribers in a mesh configuration file;
   wherein the generation of the class is divided into a generation of a server class and into a generation of a client class, the two classes are instantiated in the user program in fieldbus subscribers of the type IO controller, and at least the server class is instantiated in the fieldbus subscribers of the type IO device; and
   wherein bidirectional communication is also implemented between the fieldbus subscribers of the IO controller type by the additional server class and the additional client class when a respective user program is being executed in respective fieldbus subscribers.

9. The method as claimed in claim 8, wherein during the determination of the topology, on one hand, a parallel and independent access of at least two different fieldbus subscribers of the type IO controller to the process data of the same fieldbus subscriber of the type IO device is taken into consideration and, on another hand, a free allocation of process data of arbitrary fieldbus subscribers of the type IO device to fieldbus subscribers of the type IO controller is taken into consideration and the mesh configuration file is provided from this determination comprising a configuration and the server classes and the client classes having corresponding access rights and access paths are generated with aided by the mesh configuration file.

10. The method as claimed in claim 9, wherein the generated class or in cases of generating subclasses the following construction and following performance features are generated for the classes which are illustrated in a C++ notation:

Class: user interface which is available at least once per fieldbus subscriber, the user interface including all access possibilities to IO modules/submodules of the fieldbus subscriber comprising functions which allow an access via at least one of symbols which are clear station wide, module slots in their entirety or in a bit granular manner, links to operators also being implementable, Class: user interface to IO mapping which is available at least once per fieldbus subscriber and including address data of the fieldbus subscriber and which controls an exchange of data between a user interface class and a communication stack class, Class: communication stack which performs calls of communication methods or functions of a protocol stack and therefore assumes a communication setup to the fieldbus subscriber, Class: network stack which is generated once per fieldbus and can be used equally by all the classes, whereby other communication stack classes being embeddable in the network stack class.

11. An engineering station for configuring and parameterizing fieldbus subscribers interconnected via a fieldbus, at least one first fieldbus subscriber being configured to at least one of provide and receive process data and a second fieldbus subscriber being configured to allow a user program to run, the engineering station comprising:

a configuration tool which is configured so as in an editor to determine a topology utilizing configuration parameters of the fieldbus subscribers in a configuration file;

a parameterization tool which is configured to parameterize and load the first fieldbus subscriber for subsequent communication via the fieldbus utilizing at least one configuration data set comprising at least a first part of the configuration file;

a program code generator configured to generate, from the configuration file and further code parts from a program library, an object-oriented class having elements and functions for communication between the second fieldbus subscriber and the first fieldbus subscriber, and an installation tool which is configured to instantiate the class in the user program of the second fieldbus subscriber such that, when the user program is being executed, the functions for the communication are utilized and access to the process data is becomes possible.

12. The engineering station as claimed in claim 11, wherein the program library comprises at least one of the following source code parts:

a first source code part which comprises code and compile options for handling different second fieldbus subscribers which are formed as a target platform of a different hardware specification, a second source code part which comprises code from interface descriptions of the first fieldbus subscriber, a third source code part which comprises code from interface descriptions regarding IO mapping classes of the first fieldbus subscriber, a fourth source code part which comprises code of descriptions of relationships between the code parts and configurations or parameterizations of all fieldbus subscribers with respect to device types, IO module types or IO submodule types, and a fifth source code part which comprises code from descriptions of different protocol stacks for different types of fieldbus communications.

13. The engineering station as claimed in claim 11, wherein the program library comprises device master data files for the individual fieldbus subscriber, the device master data files describing characteristic communication features of fieldbus subscribers.

14. The engineering station as claimed in claim 12, wherein the program library comprises device master data files for the individual fieldbus subscriber, the device master data files describing characteristic communication features of fieldbus subscribers.

15. The engineering station as claimed in claim 11, wherein the engineering station is configured to parameterize and configure the fieldbus subscribers of an IO controller type or a IO device type.

* * * * *